United States Patent Office.

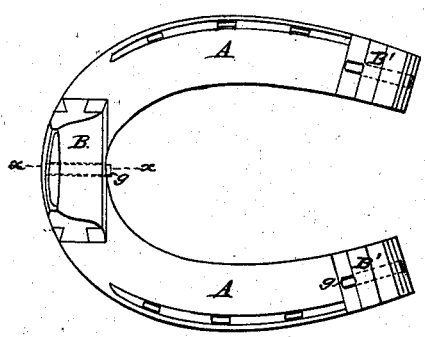
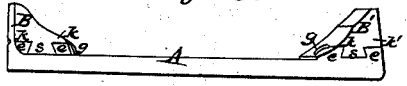
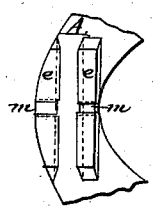

WILLIAM H. SHURTLEFF, OF PROVIDENCE, RHODE ISLAND.

Letters Patent No. 68,800, dated September 10, 1867.

IMPROVEMENT IN HORSE-SHOES.

*The Schedule referred to in these Letters Patent and making part of the same.*

TO WHOM IT MAY CONCERN:

Be it known that I, WILLIAM H. SHURTLEFF, of Providence, in the county of Providence, and State of Rhode Island, have invented certain new and useful Improvements in Horse-Shoes; and I hereby declare the following to be a full, clear, and exact description of the same, reference being had to the accompanying drawings, in which—

Figure 1 represents the under side of a horse-shoe constructed according to my invention.

Figure 2 represents a side view of the same.

Figure 3 represents a plan of a fragment of the horse-shoe with one of the calks removed; and Figure 4 represents a vertical section of the toe of the shoe following the line $x\ x$, fig. 1.

The shoes of horses and other animals are generally formed with projections, called calks, at their under sides to catch upon the ground and prevent the slipping of the animal. The usual mode of constructing such shoes has been by forming the calks in one piece of metal with the remainder of the shoe, or by welding them to it. In either case the shoe must be removed from the horse's foot when the calks require renewal or to be sharpened; and as a set of new calks is frequently rendered so dull as to be practically useless to prevent slipping after a single day's wear upon the hard pavements now in use in cities, the horse must be either permitted to do his work under the risks of falling incident to dull calks, or the shoe must be removed and replaced so frequently that the horse's hoof becomes injured by this operation, and the animal must be permitted to do no work until the hoof is restored. Hence owners of horses are frequently deprived of their services for long periods during which the hoofs are permitted to grow.

In order to obtain all the advantages which result from the continual use of sharp calks on horses' shoes, and at the same time dispense with the necessity of removing the shoes from the horse's feet when the calks become dull, shoes have sometimes been constructed with detachable calks, which, as soon as dulled or worn, can be removed from the shoe and replaced by fresh ones. This method, while superior to the former, is nevertheless open to certain objections arising from the construction of the calks, and those parts of the shoe to which they are applied. The usual manner of combining the two is to give the base of the calk a tapering dove-tail form, so as to fit and be wedged in a correspondingly tapering and dove-tailed socket formed in the shoe body. But under this arrangement the socket is very much exposed, and liable to become battered and misshapen from the frequent blows it receives as the animal's hoof is brought in contact with the ground. This not only causes the calk to become jammed and almost immovably fastened in the socket, but also, by bruising or twisting the socket, renders it very difficult if not impossible to insert a new calk after the old one has become worn. Unless, therefore, some means are employed for protecting the socket from injury it becomes practically useless, and the shoe might just as well be made with the old-fashioned unremovable calks.

The object of my invention is to overcome this defect in the manufacture of horse-shoes with removable calks, and to this end it consists substantially in the combination with a socket, formed in the shoe body, of a calk suitably shaped to fit the socket, and provided with overhanging or overlapping sides, which cover the socket and prevent its contact with the pavement or ground.

The shoe body, as represented in the accompanying drawings at A, is made of the usual form to fit the hoof of the animal to which it is to be applied. As three calks are to be used in this example, the shoe body is formed at the under side with three dove-tailed sockets or grooves, each formed by two projections $e\ e$, and each socket is made tapering in the direction of its length, so that a projection upon the calk may be driven firmly into it. The removable calks in the present example are three in number, one, B, being at the toe of the shoe, and two, B' B', at its heel. Each calk is provided with a tapering dove-tailed projection, $s$, which is fitted to slide and jam in the corresponding groove of the shoe body. Hence, when the calk becomes dulled by use, it can be driven out from the shoe body, and a new one, or an old one resharpened by grinding or other means, can be inserted in its place without the necessity of removing the shoe-stock from the animal's hoof. In order to protect the projections $e$, which form the socket, from being battered or forcibly struck against the pavement when the horse's hoof is brought in contact with the ground, the calk is formed above its dove-tailed and tapering base with overhanging or overlapping sides, which rest upon and completely cover that portion of the projections $e$ which would otherwise be exposed to wear and injury. If the sides of the calk, instead of being thus shaped, had a gradual taper from the base which fits in the dove-tailed groove or socket to the point; the projections e would be entirely uncovered, thus not only rendering them liable to be accidentally bruised and jammed to such an extent as to render it impossible at times either to withdraw the old calk or insert the new one, but exposing them at all times to the ordinary wear and tear of travel, which would soon unfit them for use, and require the frequent removal of the shoe. By having the sides $k$ lap upon the projections $e$, this defect is entirely removed, and the socket is completely shielded from harm. In order to prevent the accidental detachment of the calk it is perforated transversely, and corresponding grooves $m$ $m$ are formed in the projections $e$ $e$, which form the calk socket of the shoe body. When the calk is in place, a small key, $g$, is driven through the hole and grooves, and is bent or twisted at its inner end so as to prevent its displacement, and as this key extends across the socket of the shoe body and the projection of the calk, the latter is prevented from moving until the key is detached by hand.

Having described my invention, and the manner in which the same is or may be carried into effect, what I claim, and desire to secure by Letters Patent, is—

The combination, with a socket in the shoe body, of a removable calk, the parts being formed respectively so that the said calk shall lap over and protect the said socket, substantially in the manner herein shown and specified.

In testimony whereof I have signed my name to this specification before two subscribing witnesses.

WILLIAM HENRY SHURTLEFF.

Witnesses:
CHARLES J. SWEET,
THOMAS J. PECKHAM.